United States Patent
Dar et al.

(10) Patent No.: US 9,344,420 B2
(45) Date of Patent: May 17, 2016

(54) SYSTEMS AND METHODS FOR DEPLOYING RICH INTERNET APPLICATIONS IN A SECURE COMPUTING ENVIRONMENT

(71) Applicant: OpenFin Inc., New York, NY (US)

(72) Inventors: Mazyar Majid Dar, New York, NY (US); Fred Charles Doerr, New York, NY (US)

(73) Assignee: OpenFin Inc., New York, NY (US)

( * ) Notice: Subject to any disclaimer, the term of this patent is extended or adjusted under 35 U.S.C. 154(b) by 8 days.

(21) Appl. No.: 14/205,573

(22) Filed: Mar. 12, 2014

(65) Prior Publication Data

US 2014/0196122 A1  Jul. 10, 2014

Related U.S. Application Data

(60) Provisional application No. 61/781,746, filed on Mar. 14, 2013.

(51) Int. Cl.
*H04L 29/06* (2006.01)
*H04L 29/08* (2006.01)

(52) U.S. Cl.
CPC ................ *H04L 63/08* (2013.01); *H04L 63/10* (2013.01); *H04L 67/02* (2013.01)

(58) Field of Classification Search
CPC .............................. H04L 63/08; H04L 63/10
USPC ............................................................. 724/4
See application file for complete search history.

(56) References Cited

U.S. PATENT DOCUMENTS

| | | | |
|---|---|---|---|
| 2005/0038874 A1* | 2/2005 | Ramaswamy .......... | H04L 29/06 709/219 |
| 2006/0080464 A1* | 4/2006 | Kozuki .......................... | 709/245 |
| 2006/0129560 A1* | 6/2006 | Adams ...................... | G06F 8/20 |
| 2006/0161563 A1* | 7/2006 | Besbris .................. | G06F 9/445 |
| 2008/0162199 A1* | 7/2008 | Smith ..................... | G06Q 10/02 705/5 |
| 2008/0168539 A1* | 7/2008 | Stein ................................ | 726/5 |
| 2009/0037197 A1* | 2/2009 | McCrae .................. | G06F 17/30 705/317 |
| 2011/0213681 A1* | 9/2011 | Shahid .................... | G06Q 30/02 705/27.1 |
| 2011/0214117 A1* | 9/2011 | Hattori ..................... | G06F 8/38 717/173 |
| 2011/0271289 A1* | 11/2011 | Weiser .................... | G06F 9/547 719/317 |
| 2012/0260267 A1* | 10/2012 | Cucu ....................... | G06F 9/541 719/328 |
| 2013/0086687 A1* | 4/2013 | Chess ..................... | G06F 21/53 726/25 |
| 2013/0224855 A1* | 8/2013 | Gupta et al. .................. | 435/348 |
| 2013/0254855 A1* | 9/2013 | Walters et al. .................... | 726/5 |
| 2013/0346477 A1* | 12/2013 | Chris .................. | H04L 61/3035 709/203 |
| 2014/0372986 A1* | 12/2014 | Levin .................. | G06F 9/44589 717/126 |

* cited by examiner

*Primary Examiner* — Hadi Armouche
*Assistant Examiner* — Ali Shayanfar
(74) *Attorney, Agent, or Firm* — Lowenstein Sandler LLP

(57) ABSTRACT

Systems and methods for deploying rich internet applications in a secure computing environment. An example distributed computer system may comprise: a first computer system comprising a run-time environment executing one or more rich internet applications; a second computer system communicatively coupled to the first computer system, the second computer system executing an administration server; wherein the run-time environment is configured to query the administration server to perform at least one of: authenticating a user of the first computer system, determining whether an application is allowed to be executed within the run-time environment, or determining whether an application being executed by the run-time environment is allowed to access a certain function exposed by an application-programming interface (API) of the run-time environment.

18 Claims, 4 Drawing Sheets

SYSTEMS AND METHODS FOR DEPLOYING RICH INTERNET APPLICATIONS IN A SECURE COMPUTING ENVIRONMENT

CROSS-REFERENCE TO RELATED APPLICATIONS

This application claims the benefit of U.S. Provisional Application No. 61/781,746, filed Mar. 14, 2013, the entirety of which is incorporated herein by reference.

BACKGROUND

In enterprise computing environments, end users' computers are usually managed by IT administrators. For security and maintenance reasons, users typically do not have administration rights on their computers. This prevents them from installing applications on the computer directly and instead applications are deployed centrally by administrators through what is referred to as an application packaging process.

In the financial industry, for example, firms such as banks and hedge funds have strict security and compliance policies. Users are prevented from installing applications on their computers to protect against potential security threats. Before an application is packaged and deployed to a user's computer, most firms conduct an IT security review to ensure that the application meets security and compliance standards. Similar processes are followed to update an application that was previously installed on a user's computer.

Such application deployment processes create two significant problems for application developers. First, IT security reviews and application packaging processes can take months to complete, causing delays in deploying the application to users. Second, different firms deploy and update applications at different times, requiring application developers to simultaneously support multiple versions of their application. This is particularly a problem for internet-based applications such as trading applications where users from different firms interact with one another through the application and therefore usually need to be using the same version of the application.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
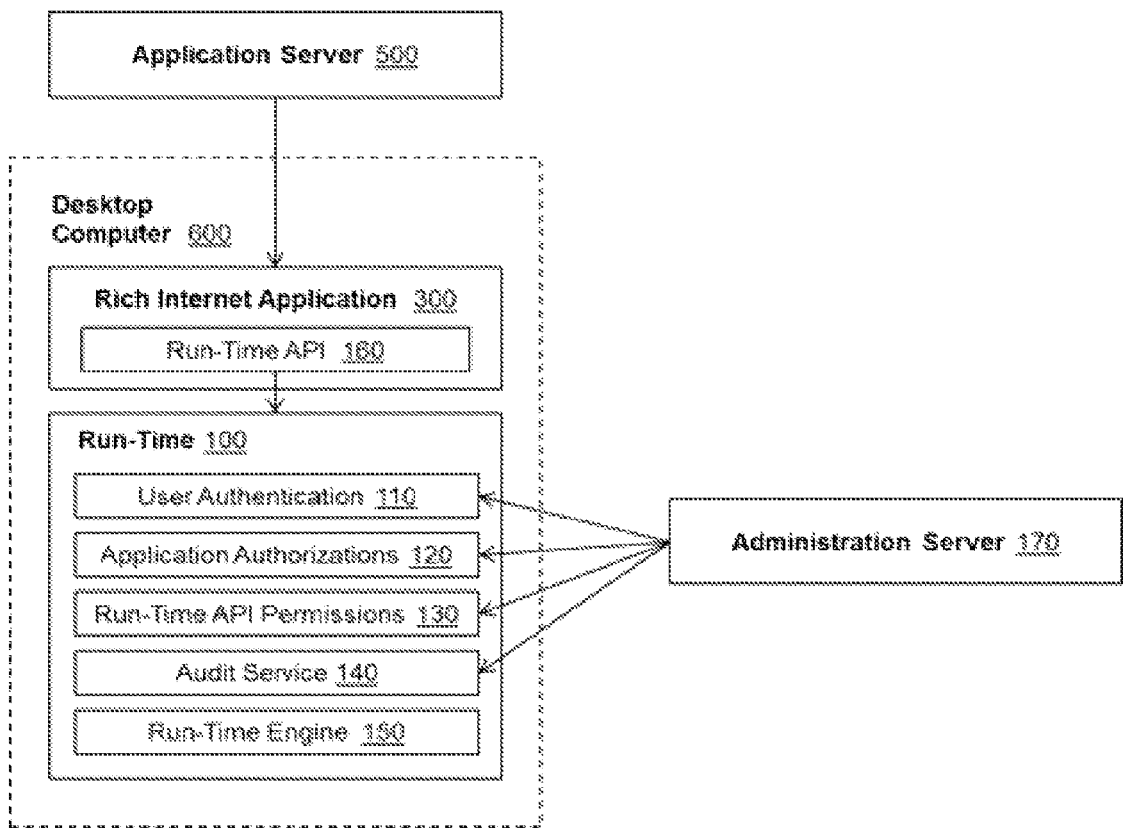
FIG. 1 shows an exemplary deployment of a rich internet application (RIA) 300 using the run-time environment 100 which is managed by an administration server 160.

In secure enterprise computing environments, developers of internet-based applications often build rich internet applications (RIAs) to solve application deployment problems. RIAs support many of the features of installed applications such as rich graphical interfaces and popup notifications. However, RIAs differ from installed applications in two important respects. First, RIAs are typically deployed from a central server and are usually updated automatically each time a user attempts to access the application. This means users across different firms are always using the same (i.e. latest) version of the application. Second, RIAs typically execute in run-time software which restricts the application inside what is referred to as a security sandbox. This prevents the application from directly accessing the user's computer and protects the computer from security threats.

In the financial industry, developers of trading applications and other real-time desktop applications use several different RIA technologies including Java WebStart, Adobe Air and Microsoft ClickOnce. While these run-time technologies improve application deployment, they have a number of important deficiencies that are needed in secure enterprise computing environments. First, once the run-time software is installed on a user's computer, a user has the ability to freely access any supported application available on the internet. This circumvents IT security policies designed to ensure that users only access authorized applications. Second, run-time technologies typically allow an application to request permission from a user to access resources outside of the security sandbox. For example, an application may request to save a file on the user's computer, potentially exposing the computer to a virus. Third, run-time technologies don't provide a method for an IT administrator to easily disable features of the run-time software. This may be needed if the IT administrator considers a particularly feature to expose a security threat. Fourth, run-time technologies don't authenticate the identity of a user. This requires each application to separately authenticate each user. Fifth, run-time technologies don't maintain a record of the applications a user accesses and the actions a user performs while using the application. This is critically important for creating audit trails required by government regulations, including those regulating the financial industry. Sixth, run-time technologies don't provide a method for different applications running on the same user's computer to communicate and integrate with one another. This is needed in any environment where there are multiple related applications that have a need to share information.

To address these significant problems, a new technology is needed that can provide necessary controls to IT administrators, simplify application deployment for developers and enable integration between applications.

Described herein are systems and methods for deploying rich internet applications (RIAs) into a desktop computing environment managed by IT administrators. The techniques described provide significant improvements over existing techniques of application deployment in secure enterprise computing environments. The improvements include better security, faster time-to-market, lower cost of deployment and enhanced user experience.

The system includes a run-time environment, a run-time API, and an administration server. The run-time environment is used for deploying and running RIAs using strict security controls including user authentication, application authorization, application audit, permissioned access to run-time functionality and application isolation. The run-time environment also enables secure, client-side messaging between RIAs. The run-time API provides a programming interface that can be used by an RIA to access run-time functionality. The administration server is used by a central administrator to manage user authentication, application authorization, application audit and run-time API permissions.

Further described herein is a method for deploying RIAs to end users' computers managed by IT administrators. The method includes installing the run-time environment on one or more end users' computers. Each instance of the run-time environment is configured to communicate with an administration server. The administration server is configured to associate a user of the run-time environment with RIAs that the user has been authorized to access. The administration server is also configured to allow or disallow each RIA from accessing different functionalities of the run-time environment.

In certain implementations, each RIA runs in a separate isolated process. This prevents each RIA from harming other RIAs running in the run-time environment and also prevents the RIAs from harming the computer. The RIAs, though isolated in separate processes, are able to communicate securely with one another using a client-side inter-application messaging bus. This enables RIAs to be integrated with one another in order to provide an enhanced user experience.

In certain implementations, actions performed by a user or an RIA are audit by an audit service within the run-time environment. The audit service captures audit information and can store audit information on the end user's computer as well as deliver the audit information to the administration server. This streamlines the collection of audit information and provides additional tools to central administrators.

The present document describes systems and methods for deploying rich internet applications (RIAs) into a desktop computing environment managed by IT administrators. The techniques described provide significant improvements over existing techniques of application deployment in secure enterprise computing environments. The descriptions below should be read in conjunction with the accompanying drawings FIG. 1 through 5.

Figure 5:
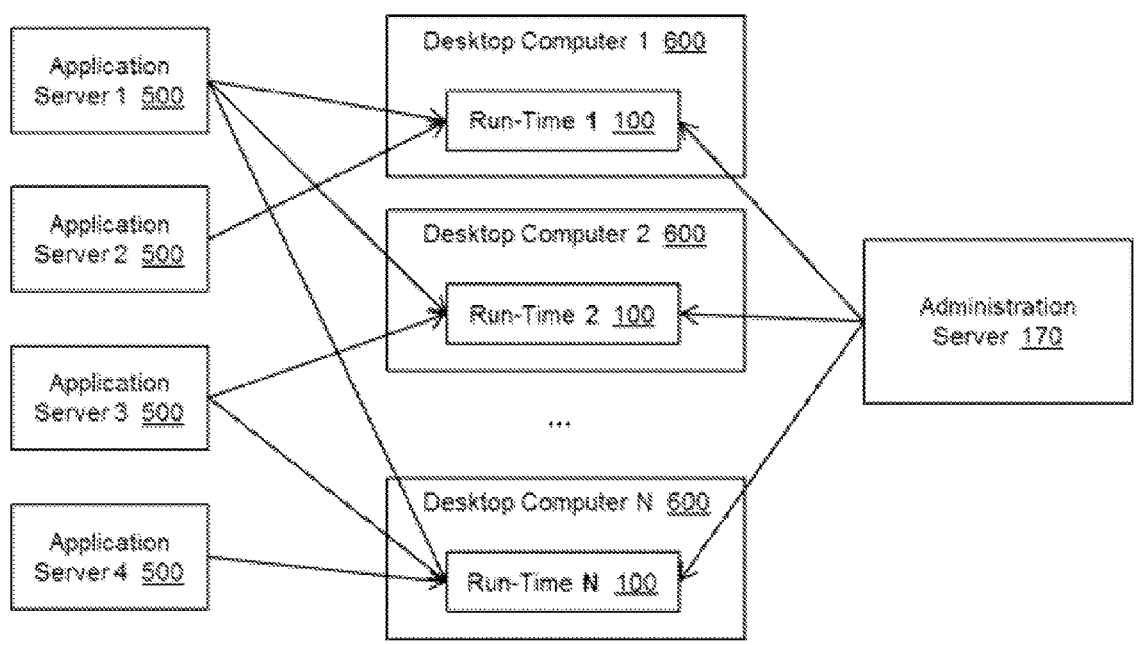
FIG. 5 shows an exemplary network diagram where the run-time environment 100 has been installed on multiple desktop computers 600 and multiple RIAs 300 are deployed to the different instances of the run-time environment 100.

The system comprises one or more computers 600 (including, e.g., desktop and/or portable computers) each running one or more instances of the run-time environment 100. The run-time environment 100 is managed centrally, through secure network connections, by one or more administration servers 170. The run-time environment 100 interacts via network connections with one or more application servers 500 which each host one or more RIAs 300. An exemplary system is depicted in FIG. 5.

Referring to FIG. 1, an exemplary run-time environment 100 includes a user authentication service 110, an application authorization layer 120, a run-time API permissions layer 130, an audit service 140, and a run-time engine 150. The run-time environment 100 may or may not include each of these components. In one embodiment, the run-time environment 100 includes a user authentication service 110 and a run-time engine 150. In another embodiment, the run-time environment 100 further includes a run-time API permissions layer 130 and a run-time engine 150.

A user authentication service 110 provides a process for authenticating the identity of a user when the run-time environment 100 is launched. In one embodiment, the user authentication service 100 communicates with an administration server 170 to perform the authentication. In another embodiment, the user authentication service 100 receives credentials from the computer's 600 operating system.

The application authorization layer 120 provides controls to allow or disallow an RIA 300 to run in the run-time environment 100. Authorizations are provided by a central administrator via the administration server 170. In one embodiment, the authorizations are managed directly on the administration server 170 through an online dashboard. In another embodiment, authorizations are updated on the administration server 170 through an API that connects the administrator server 170 to another system.

The run-time API permissions layer 130 provides controls to allow or disallow an RIA 300 to access certain functionalities from being used within the run-time environment 100. For example, using the run-time API permissions 130 an RIA 300 can be prevented from performing an exit action that would cause the run-time environment 100 to stop executing. In another example, using the run-time API permissions 130 an RIA 300 can be prevented from storing files on the computer's 600 file system. Permissions are provided by a central administrator via the administration server 170. In one embodiment, the authorizations are managed directly on the administration server 170 through an online dashboard. In another embodiment, authorizations are updated on the administration server 170 through an API that connects the administrator server 170 to another system.

The audit service 140 captures user actions such as launching or closing an application, moving or resizing windows and mouse click events. In one embodiment, the audit service 140 stores audit information on the computer's 600 file system and periodically sends audit information to the administration server 170. In another embodiment, the audit information is delivered in real-time to the administration 170 as it is being captured.

The run-time engine 150 is responsible for execution of one or more RIAs 300 as well as displaying of the graphical user interface of each RIA 300. In one embodiment, the run-time engine 150 is a WebKit-based rendering engine such as Google Chromium.

The run-time API 160 provides programming interfaces use by an RIA 300 to access certain functionalities of the run-time environment 100. For example, the run-time API 160 may provide programming interfaces for showing or hiding a window. In another example, the run-time API 160 may provide programming interfaces for displaying a notification or alert. The run-time API 160 is incorporated into an RIA 300 by a software developer. In different embodiments, the run-time API 160 is written in different programming languages including JavaScript, Java, ActionScript, C++ and C#.

The administration server 170 is comprised of one or more central servers that communicate securely with the run-time environment 100 and allow central administrators to access and manage various components of the run-time environment 100 including the user authentication service 110, the application authorization layer 120, a run-time API permissions layer 130 and an audit service 140.

The application server 500 is comprised of one or more servers responsible for hosting one or more RIAs 300. The run-time environment 100 is able to simultaneously execute different RIAs 300 each being hosted by a different application server 500. In one embodiment, the application server 500 is a web server like Apache Tomcat.

Figure 2:
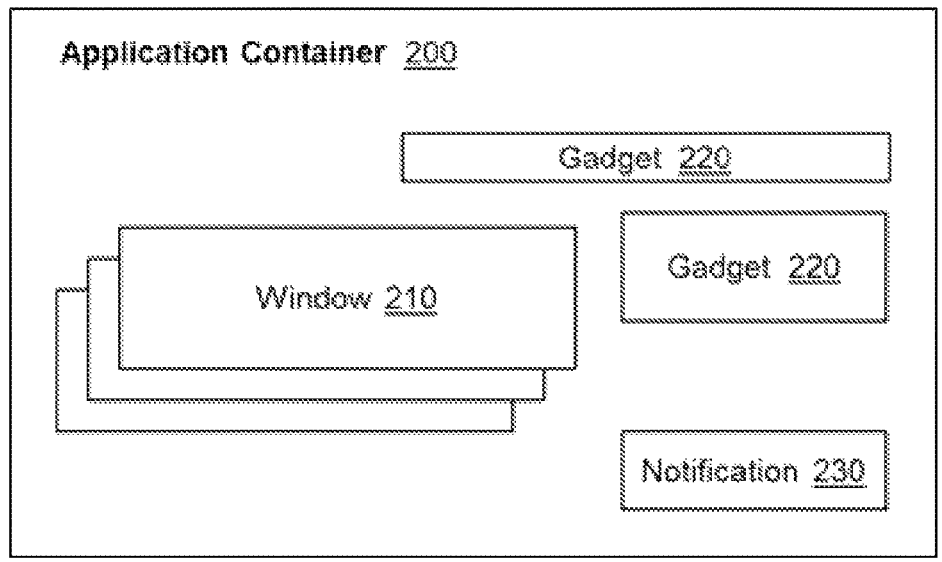
FIG. 2 shows an exemplary application container 200 with various graphical user interface components.

Referring to FIG. 2, when executing in the run-time environment, each RIA 300 runs in a separate application container 200. In an exemplary embodiment, an application container 200 is a collection of one or more top-level graphical user interface (GUI) components such as windows 210, gadgets 220 and notifications 230 that are part of the RIA. A window 210 is a GUI component that can be resized, moved, minimized, restored, hidden and shown. A gadget 220 is a GUI component that is usually small and used for a single-screen, single-purpose application or widget. A gadget 220 usually remains on the desktop and is not minimizable or resizable. A notification 230 is a GUI component that usually displays for a short period of time and usually with motion in order to visually capture a user's attention (for example to alert the user about a time-sensitive event). The implementation of an RIA 300 inside an application container 200 enables the RIA 300 to have multiple GUI components which execute and stop executing in unison. This is an important feature of native or installed applications that differentiates them from browser-based applications which typically execute inside a single window or tab.

Figure 3:
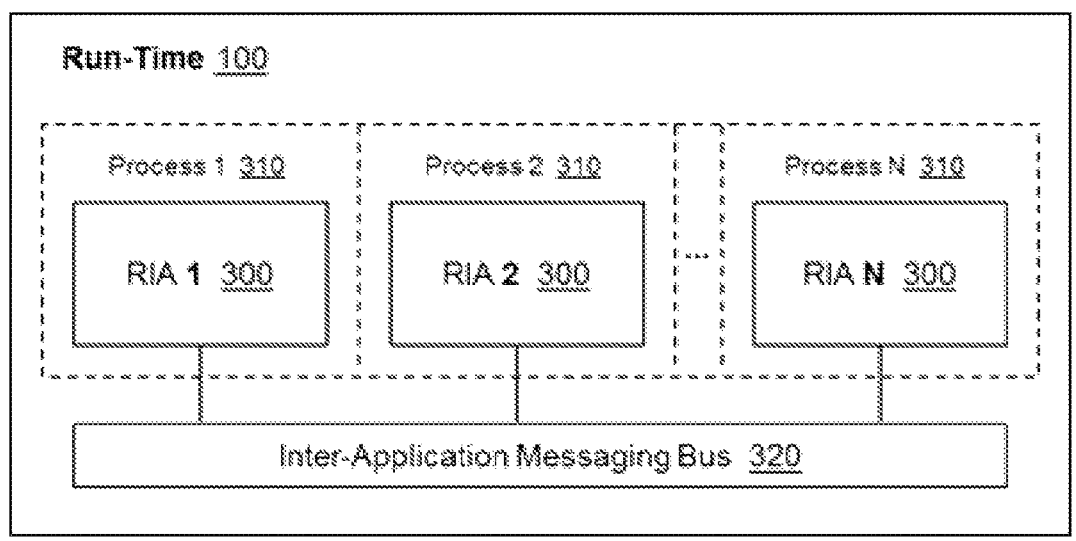
FIG. 3 shows an exemplary multi-application architecture of the run-time environment which isolates RIAs 300 from one another and allows secure communication through a inter-application messaging bus 320.
Figure 4:
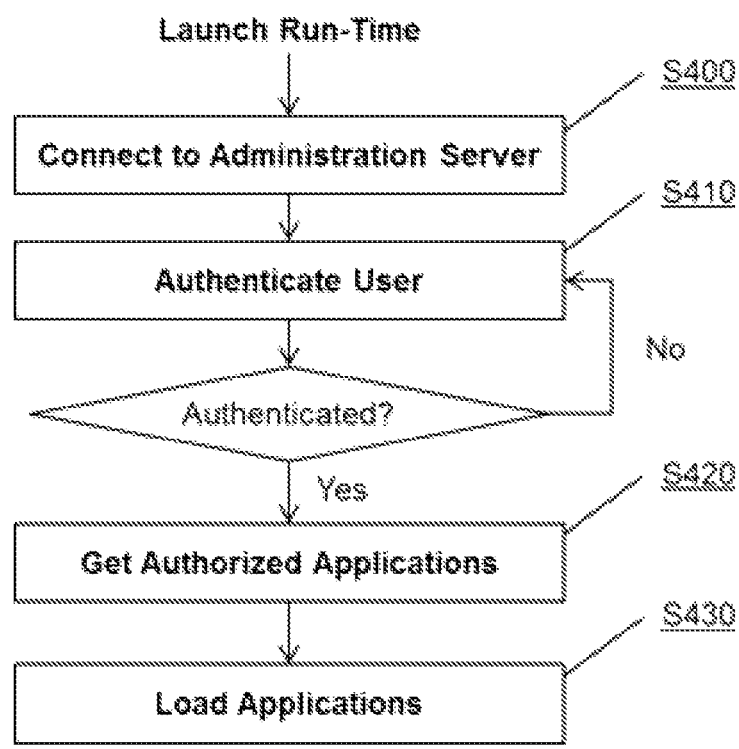
FIG. 4 shows a flowchart of an exemplary process for launching the run-time environment 100.

Referring to FIG. 3, RIAs 300 are isolated from one another when executing in the run-time environment 100. This prevents each RIA 300 from harming another RIA 300 or the computer 600 and is an important part of the security model described herein. In an exemplary embodiment, depicted in FIG. 3, the RIA isolation is effected by running each RIA 300 in a separate operating system process 310.

Still referring to FIG. 3, in certain implementations, RIAs 300 are able to securely communicate with one another via an inter-application messaging bus 320. Each RIA 300 connects securely to the inter-application messaging bus 320. Once connected, the RIA 300 is able to send messages via the inter-application messaging bus 320 and those messages can be received by other RIAs 300 also connected to the inter-application messaging bus 320. In one embodiment, the inter-application messaging bus is a WebSocket server that is part of the run-time engine 150 and each RIA 300 connects securely to the WebSocket server by establishing a WebSocket connection.

Referring to FIG. 1 and FIG. 3, in certain implementations, application authorizations 120 may be used to allow or disallow one RIA 300 from communicating via the inter-application messaging bus 320 to another RIA 300. This provides further security to prevent one RIA 300 from harming another RIA 300 via the inter-application messaging bus 320. In one embodiment, application authorizations 120 related to the inter-application messaging bus 320 are provided by the administration server. In another embodiment, application authorizations 120 related to the inter-application messaging bus 320 are provided by each RIA 300 interacting with its application server 500.

Described herein are methods for deploying RIAs 300 in a secure desktop computing environment. This can be done by first performing the following setup. First, install the run-time environment 100 on a computer 600 and associate the run-time environment 100 with an administration server 170. Next, configure the administration server 170 to provide authorization for one or more users to access one or more RIAs 300. Once the setup has been completed and the user launches the run-time environment 100, perform the following steps described in FIG. 4. First, the run-time environment 100 establishes a secure connection to the administration server S400. Next, the run-time environment 100 uses its user authentication service 110 to authenticate the identity of the user S410. If the user cannot be authenticated, the run-time environment 100 does not allow the user to proceed to the next step. Next, the run-time environment 100 sends a request to the administration server 170 to send information needed to create and launch each RIA 300 which the user has been authorized to access S420. Next the run-time environment 100 uses the information received from the administration server 170 to load and run each RIA 300.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the methods and/or each of their individual functions, routines, subroutines, or operations. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A distributed computer system comprising:
   a first computer system comprising a hardware processor and a run-time environment executing one or more rich internet applications;
   a second computer system communicatively coupled to the first computer system, the second computer system executing an administration server;
   wherein the run-time environment is configured to query the administration server to authenticate a user of the first computer system, determine whether an application is allowed to be executed within the run-time environment, determine whether an application being executed by the run-time environment is allowed to access a certain function exposed by an application-programming interface (API) of the run-time environment, and prevent an application being executed by the run-time environment from executing an exit action to terminate the run-time environment; and
   wherein the run-time environment comprises an audit service configured to capture audit information associated with user actions, store the audit information and transmit the audit information to the administration server.

2. The distributed computer system of claim 1, wherein the first computer system is provided by a desktop computer.

3. The distributed computer system of claim 1, wherein the run-time environment further comprises at least one of: a user authentication service, an application authorization service, a run-time API permission service, a run-time engine, and a client-side inter-application messaging bus.

4. The distributed computer system of claim 3, wherein the user authentication service is configured to authenticate the user by querying the administration server.

5. The distributed computer system of claim 3, wherein the application authorization service is configured to determine, by querying the administration server, whether the application is allowed to be executed within the run-time environment.

6. The distributed computer system of claim 3, wherein the run-time API permission service is configured to determine, by querying the administration server, whether the application is allowed to access a certain function exposed by an API of the run-time environment.

7. The distributed computer system of claim 3, wherein the administration server comprises at least one of: a user interface or an API for managing permissions for the run-time API permission service.

8. The distributed computer system of claim 3, wherein the administration server comprises at least one of: a user interface or an API for managing authorizations for the application authorization service.

9. The distributed computer system of claim 1, further comprising a third computer system communicatively coupled to the second computer system, the third computer system comprising the run-time environment for executing rich internet applications.

10. A method, comprising:
   providing, by a first computer system, a run-time environment for executing rich internet applications;
   querying an administration server to authenticate a user of the first computer system;
   responsive to receiving an input by the user selecting a first application residing on a second computer system, querying the administration server to determine whether the first application is allowed to be executed within the run-time environment; and
   responsive to determining that the first application is allowed to be executed, downloading the application from the second computer system;
   determining whether the first application is allowed to access a certain function exposed by an application-programming interface (API) of the run-time environment;
   executing the first application within a first process associated with the run-time environment;
   preventing the first application from executing an exit action to terminate the run-time environment; and
   capturing, by an audit service, audit information associated with user actions, storing the audit information and transmitting the audit information to the administration server.

11. The method of claim 10, wherein the first computer system is provided by a desktop computer.

12. The method of claim 10, wherein the first application is provided by a rich internet application.

13. The method of claim 10, further comprising: authenticating the user by querying the administration server.

14. The method of claim 10, further comprising:
   determining, by querying the administration server, whether the user is allowed to cause the first application to be executed within the run-time environment.

15. The method of claim 10, further comprising:
   determining, by querying the administration server, whether the first application is allowed to access a certain function exposed by an API of the run-time environment.

16. The method of claim 10, wherein executing the first application further comprises providing an application container for the first application, the application container comprising one or more graphical user interface (GUI) components.

17. The method of claim 10, further comprising: executing a second application within a second process associated with the run-time environment.

18. The method of claim 17, further comprising:
   receiving, by the run-time environment, a message transmitted by the first application; and
   delivering the message to the second application.

* * * * *